(12) United States Patent
Yu

(10) Patent No.: US 10,053,109 B2
(45) Date of Patent: Aug. 21, 2018

(54) SYSTEMS AND METHODS FOR CONTROLLING A VEHICLE INCLUDING FRICTION CONTROL DEVICE

(71) Applicant: Jinghong Yu, Dublin, OH (US)

(72) Inventor: Jinghong Yu, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 54 days.

(21) Appl. No.: 15/055,148

(22) Filed: Feb. 26, 2016

(65) Prior Publication Data

US 2017/0247039 A1    Aug. 31, 2017

(51) Int. Cl.
*B60W 50/00* (2006.01)
*B60W 10/20* (2006.01)
*B60W 10/22* (2006.01)
*G05D 1/00* (2006.01)

(52) U.S. Cl.
CPC ........ *B60W 50/0098* (2013.01); *B60W 10/20* (2013.01); *B60W 10/22* (2013.01); *G05D 1/0066* (2013.01); *B60W 2520/10* (2013.01); *B60W 2520/105* (2013.01); *B60W 2710/20* (2013.01); *B60W 2710/226* (2013.01)

(58) Field of Classification Search
None
See application file for complete search history.

(56) References Cited

U.S. PATENT DOCUMENTS

| 4,070,121 A | 1/1978 | Graham |
| 4,159,186 A | 6/1979 | Funcke |
| 4,468,739 A | 8/1984 | Woods et al. |
| 4,537,524 A | 8/1985 | Hanson |
| 4,709,593 A | 12/1987 | Takeuchi |
| 5,052,844 A | 10/1991 | Kendall |
| 5,253,728 A | 10/1993 | Matsuno et al. |

(Continued)

FOREIGN PATENT DOCUMENTS

| DE | 4230465 A1 | 3/1993 |
| JP | 60053465 A | 3/1985 |

(Continued)

OTHER PUBLICATIONS

Office Action issued in German Patent Application No. 10 2017 203 098.4, dated Nov. 28, 2017, and Unofficial Translation thereof, 12 pages.

(Continued)

*Primary Examiner* — James M McPherson
(74) *Attorney, Agent, or Firm* — Armstrong Teasdale LLP

(57) ABSTRACT

Systems and methods for controlling a vehicle including a friction control device are provided. A method of controlling the vehicle includes operating at least one friction control device in a first of a plurality of friction modes, detecting a vehicular speed, changing operation of the at least one friction control device from the first friction mode to a second of the plurality of friction modes in response to the vehicular speed exceeding a first threshold speed value, and changing operation of the at least one friction control device from the second friction mode to the first friction mode in response to the vehicular speed falling below a second threshold speed value that is less than the first threshold speed value. The second friction mode is associated with a higher level of resistance than the first friction mode.

21 Claims, 6 Drawing Sheets

(56) References Cited

U.S. PATENT DOCUMENTS

| | | |
|---|---|---|
| 5,265,691 A | 11/1993 | Konishi et al. |
| 5,346,241 A | 9/1994 | Lee |
| 5,388,658 A | 2/1995 | Ando et al. |
| 5,415,426 A | 5/1995 | Strasser |
| 5,431,429 A | 7/1995 | Lee |
| 5,435,591 A | 7/1995 | Lee |
| 5,442,554 A | 8/1995 | Ohtagaki |
| 5,560,590 A | 10/1996 | Reast |
| 5,620,390 A | 4/1997 | Kono et al. |
| 5,704,727 A | 1/1998 | Atkins et al. |
| 5,721,681 A | 2/1998 | Borschert et al. |
| 5,816,731 A | 10/1998 | Howard |
| 6,032,755 A | 3/2000 | Blandino et al. |
| 6,077,302 A | 6/2000 | Kumra et al. |
| 6,145,400 A | 11/2000 | Garza |
| 6,154,696 A | 11/2000 | Nishi et al. |
| 6,164,860 A | 12/2000 | Kondo |
| 6,412,591 B1 | 7/2002 | Endo et al. |
| 6,530,625 B2 | 3/2003 | Arnold et al. |
| 6,533,490 B2 | 3/2003 | Kincaid et al. |
| 6,597,975 B1 | 7/2003 | Shinmura et al. |
| 6,701,236 B2 | 3/2004 | Ulyanov et al. |
| 6,726,229 B2 | 4/2004 | Smith et al. |
| 6,945,541 B2 | 9/2005 | Brown |
| 7,048,461 B2 | 5/2006 | Williams |
| 7,076,351 B2 | 7/2006 | Hamilton et al. |
| 7,089,104 B2 | 8/2006 | Post, II et al. |
| 7,096,170 B2 | 8/2006 | Fujita |
| 7,110,926 B2 | 9/2006 | Nishizawa et al. |
| 7,185,902 B1 | 3/2007 | Lloyd |
| 7,234,712 B2 | 6/2007 | Yamazaki et al. |
| 7,272,478 B2 | 9/2007 | Tamai |
| 7,299,120 B2 | 11/2007 | Serebrennikov |
| 7,464,906 B2 | 12/2008 | Temperato et al. |
| 7,476,050 B2 | 1/2009 | Ditzler |
| 7,537,407 B2 | 5/2009 | Shima |
| 8,682,532 B2 | 3/2014 | Yu |
| 2002/0138186 A1 | 9/2002 | Kim |
| 2005/0049761 A1 | 3/2005 | Kataoka et al. |
| 2008/0034910 A1 | 2/2008 | Roline et al. |
| 2008/0249690 A1 | 10/2008 | Matsumoto et al. |
| 2008/0281491 A1 | 11/2008 | Yasui et al. |
| 2009/0024277 A1 | 1/2009 | Poilbout |
| 2009/0103974 A1 | 4/2009 | Dendis et al. |
| 2009/0254249 A1 | 10/2009 | Ghoneim et al. |
| 2009/0266658 A1 | 10/2009 | Lueker, Jr. |
| 2009/0287377 A1 | 11/2009 | Nakamura et al. |
| 2010/0250081 A1 | 9/2010 | Kinser et al. |
| 2014/0019009 A1* | 1/2014 | Kogiso ............. B62D 15/0235 701/42 |

FOREIGN PATENT DOCUMENTS

| | | |
|---|---|---|
| JP | 2002161969 A | 6/2002 |
| JP | 2005067455 A | 3/2005 |
| JP | 2005104416 A | 4/2005 |
| JP | 2005170116 A | 6/2005 |
| JP | 2007083940 A | 4/2007 |

OTHER PUBLICATIONS

Search Report issued in German Patent Application No. 10 2017 203 098.4, dated Oct. 26, 2017, and Unofficial Translation thereof, 18 pages.

* cited by examiner

SYSTEMS AND METHODS FOR CONTROLLING A VEHICLE INCLUDING FRICTION CONTROL DEVICE

BACKGROUND

The present disclosure relates generally to vehicle control systems and, more specifically, to vehicle control systems for use in controlling operation of a friction control device.

At least some known vehicle suspension systems include friction control devices that can be selectively varied in operation between a nominal friction mode and an increased friction mode to affect vehicle performance. Repeated switching of the friction control device between different friction modes can result in less than optimal vehicle performance. Accordingly, a need exists for a control system and method to inhibit or prevent repeated switching of friction control devices between different friction modes.

BRIEF SUMMARY

In one aspect, a method of controlling a vehicle is provided. The method includes operating at least one friction control device in a first of a plurality of friction modes, detecting a vehicular speed, changing operation of the at least one friction control device from the first friction mode to a second of the plurality of friction modes in response to the vehicular speed exceeding a first threshold speed value, and changing operation of the at least one friction control device from the second friction mode to the first friction mode in response to the vehicular speed falling below a second threshold speed value that is less than the first threshold speed value. The at least one friction control device includes one of a suspension damper, a control arm ball joint, a strut bearing, a steering rack guide, and an outer tie rod ball joint. The second friction mode is associated with a higher level of resistance than the first friction mode.

In another aspect, a vehicle control system for use in controlling operation of a vehicle is provided. The vehicle control system includes at least one friction control device configured to operate in a first of a plurality of friction modes, and a controller communicatively connected to the at least one friction control device. The at least one friction control device includes one of a suspension damper, a control arm ball joint, a strut bearing, a steering rack guide, and an outer tie rod ball joint. The controller is configured to detect a vehicular speed of the vehicle, change operation of the at least one friction control device from the first friction mode to a second friction mode in response to the vehicular speed exceeding a first threshold speed value, where the second friction mode is associated with a higher level of resistance than the first friction mode, and change operation of the at least one friction control device from the second friction mode to the first friction mode in response to the vehicular speed falling below a second threshold speed value that is less than the first threshold speed value.

In yet another aspect, a controller for controlling operation of at least one friction control device that is operatively connected to a vehicle and communicatively connected to the controller is provided. The controller includes a processor, a memory device communicatively connected to the processor, and computer-executable instructions stored on the memory device. When executed by the processer, the computer-executable instructions cause the controller to detect a vehicular speed of the vehicle, change operation of the at least one friction control device from a first of a plurality of friction modes to a second of a plurality friction modes in response to the vehicular speed exceeding a first threshold speed value, where the second friction mode is associated with a higher level of resistance than the first friction mode, and change operation of the at least one friction control device from the second friction mode to the first friction mode in response to the vehicular speed falling below a second threshold speed value that is less than the first threshold speed value.

DETAILED DESCRIPTION

The systems and methods described herein relate generally to vehicle control systems and, more specifically, to vehicle control systems for use in controlling operation of a friction control device having a variable friction force and/or a variable friction torque.

Figure 1:
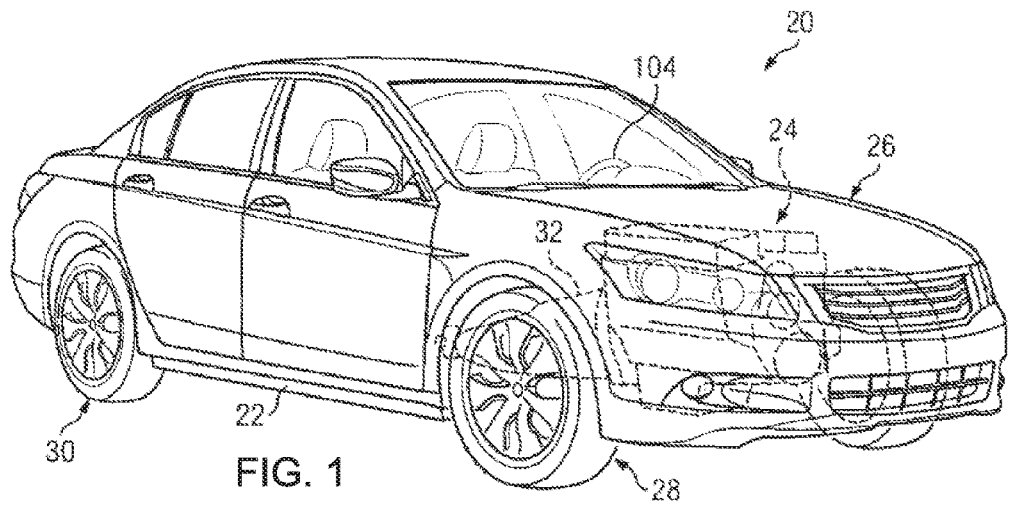
FIG. 1 is a right front perspective view of an exemplary vehicle that includes a suspension system.

FIG. 1 is a right front perspective view of an exemplary vehicle 20. In the exemplary embodiment, vehicle 20 is an automobile. In other embodiments, vehicle 20 may be any of a variety of other suitable vehicles, such as a recreational vehicle or a utility vehicle, for example. In the exemplary embodiment, vehicle 20 includes a frame 22 and an engine 24. Engine 24 is mounted within an engine compartment 26. Front wheels (e.g., 28) and rear wheels (e.g., 30) are rotatably coupled with frame 22. Vehicle 20 includes a transmission 32 that couples engine 24 with one or more of the wheels (e.g., 28, 30) of vehicle 20. Transmission 32 is coupled to engine 24 such that power from engine 24 is transmitted through transmission 32, to a drivetrain (not shown), and to the wheels (e.g., 28, 30) to propel vehicle 20. The transmission 32 can be operable in any of a plurality of gears (not shown) to facilitate operation of vehicle 20 at different speeds.

Vehicle 20 includes an accelerator pedal 34 (shown in FIG. 4) that is selectively movable (e.g., with an operator's foot) to facilitate operation of vehicle 20 at different speeds. In other embodiments, vehicle 20 can include a handoperated throttle or any of a variety of other suitable throttle devices that are movable to facilitate selective acceleration of vehicle 20.

Figure 2:
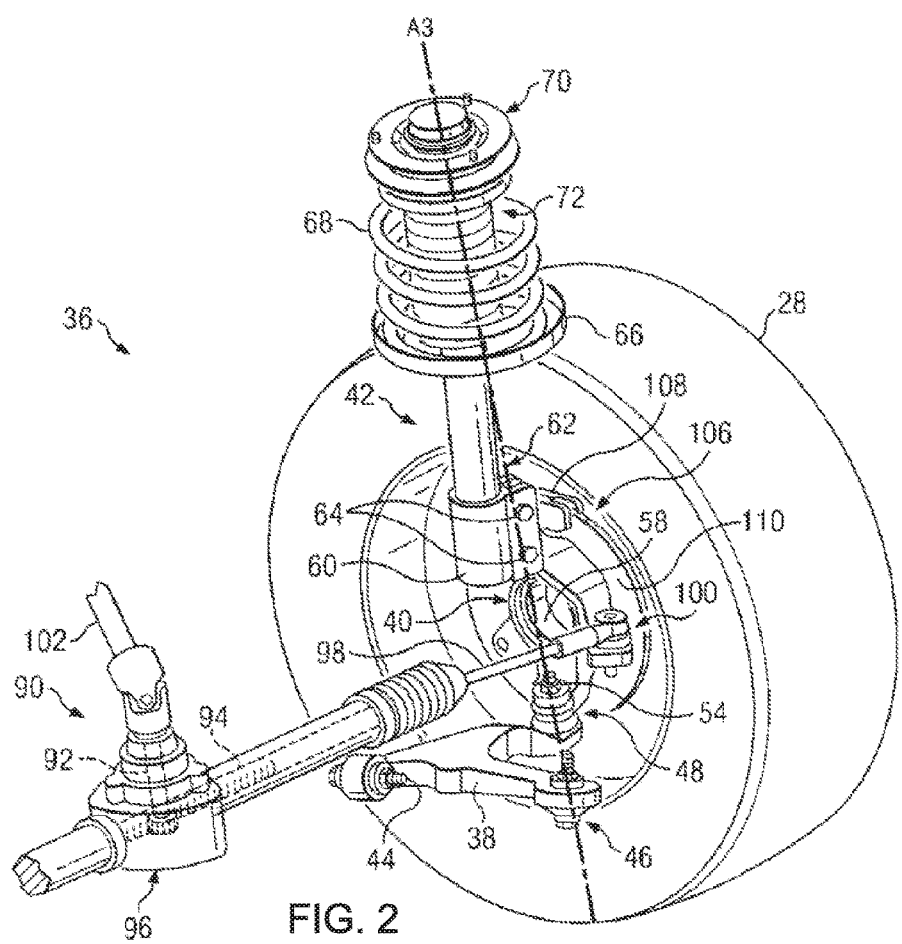
FIG. 2 is a right front perspective view of a portion of the suspension system of FIG. 1, wherein certain components of the vehicle have been omitted for clarity.

As illustrated in FIG. 2, vehicle 20 includes a suspension system 36 including a support arm 38, a wheel knuckle 40, and a suspension damper 42 that cooperate to rotatably support one of front wheels 28 with respect to frame 22. In the exemplary embodiment, support arm 38 includes a bolt 44 and a frame ball joint 46 or bushing that facilitate pivotal coupling of support arm 38 to frame 22. In other embodiments, a support arm can be configured in any of a variety of suitable alternative arrangements that facilitate its pivotal coupling with a frame of a vehicle.

Figure 3:
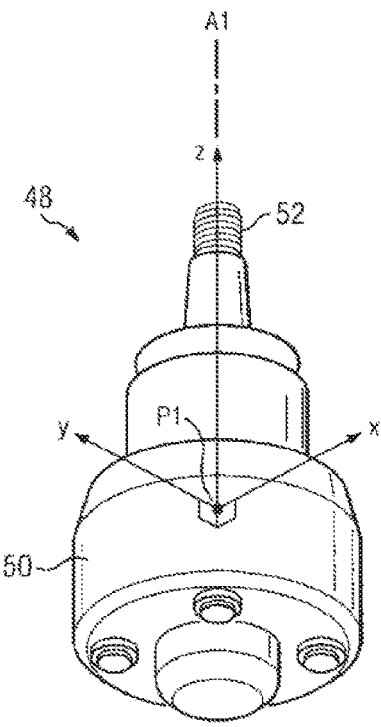
FIG. 3 is a right front perspective view of an exemplary lower control arm ball joint used with the suspension system of FIG. 2.

As illustrated in FIG. 2, wheel knuckle 40 is coupled with support arm 38 by a lower control arm ball joint 48. In the exemplary embodiment, illustrated in FIG. 3, lower control arm ball joint 48 includes a socket base 50 and a ball stem 52. Ball stem 52 is engaged with socket base 50 in a spheroid-type arrangement such that ball stem 52 is pivotable with respect to socket base 50 about a point P1 (e.g., about axes x, y, and z) and is rotatable about an axis A1 that extends along ball stem 52, as illustrated in FIG. 3. Socket base 50 is coupled with support arm 38, and ball stem 52 is coupled with wheel knuckle 40. In one embodiment, socket base 50 is coupled with support arm 38 in a press-fit arrangement or with a circlip, and ball stem 52 includes a threaded stem that is coupled to wheel knuckle 40 with a nut (e.g., 54). However, in other embodiments, a lower control arm ball joint can be coupled with a support arm and a wheel knuckle in any of a variety of suitable alternative arrangements.

In the exemplary embodiment, lower control arm ball joint 48 includes a friction control device that is configured such that a friction force (e.g., coefficient of friction) between socket base 50 and ball stem 52 may be selectively varied to change the freedom of movement between socket base 50 and ball stem 52. More specifically, in the exemplary embodiment, lower control arm ball joint 48 may be selectively varied in operation between a first friction mode and a second, increased friction mode. As lower control arm ball joint 48 changes operation from the first friction mode to the second, increased friction mode, the coefficient of friction between socket base 50 and ball stem 52 increases, which makes movement of ball stem 52 with respect to socket base 50 increasingly difficult.

Figure 4:
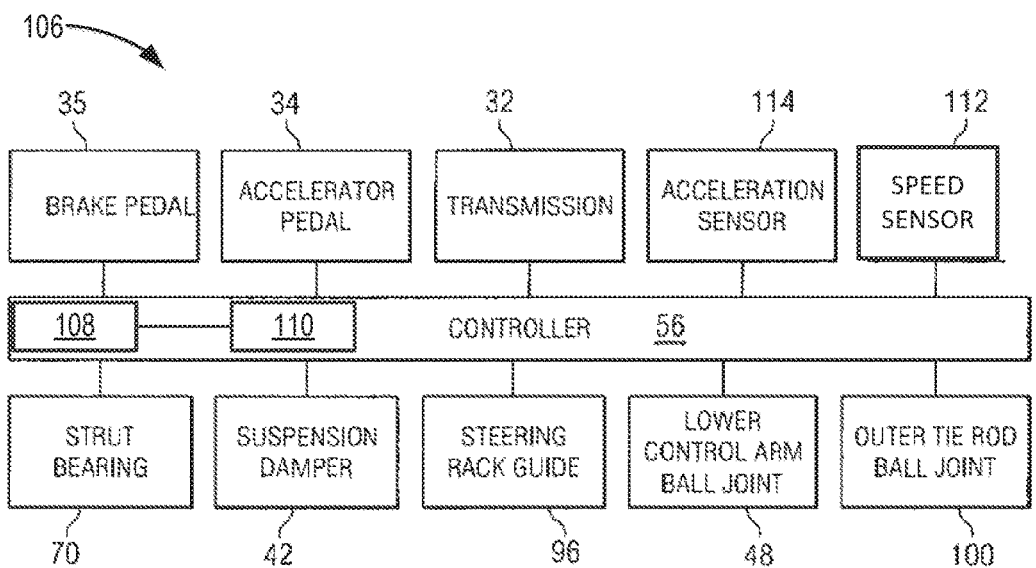
FIG. 4 is a block diagram of an exemplary vehicle control system including a controller and certain other components of the vehicle of FIG. 1.

FIG. 4 is a block diagram of an exemplary vehicle control system 106 including a controller 56 that may be used to control operation of lower control arm ball joint 48, as well as other components of vehicle 20. As shown in FIG. 4, lower control arm ball joint 48 is coupled with controller 56, to facilitate operation of lower control arm ball joint 48 between a first friction mode and a second, increased friction mode.

Controller 56 may be any suitable controller that enables vehicle 20 to function as described herein, including any suitable analog controller, digital controller, or combination of analog and digital controllers. In some embodiments, controller 56 includes an engine control unit (ECU), a power train control module (PCM), an engine control module (ECM) or any of a variety of other suitable alternative vehicular controllers. In some embodiments, controller 56 includes a processor 108 that executes computer-executable instructions loaded or stored in a memory device 110 communicatively coupled to processor 108. Controller 56 may generally include any suitable computer and/or other processing unit, including any suitable combination of computers, processing units and/or the like that may be operated independently, or in combination with one another. Thus, in several embodiments, controller 56 may include one or more processor(s) and associated memory device(s) configured to perform a variety of computer-implemented functions including, but not limited to, the functions disclosed herein, such as detecting a vehicular speed, changing operation of one or more friction control devices from one friction mode to another friction mode in response to the vehicular speed exceeding or decreasing below a threshold speed value, controlling operation of one or more friction control devices according to a friction mode schedule stored in the memory device, detecting a vertical acceleration rate of the vehicle, and changing operation of one or more friction control devices from a first friction mode to a second friction mode in response to the vertical acceleration rate exceeding a threshold acceleration rate.

As used herein, the term "processor" refers not only to integrated circuits, but also refers to a microcontroller, a microcomputer, a programmable logic controller (PLC), an application specific integrated circuit, and other programmable circuits. Additionally, the memory device(s) of controller 56 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure and/or cause the associated controller to perform various functions including, but not limited to, the functions described herein.

Referring again to FIG. 3, in the exemplary embodiment, lower control arm ball joint 48 includes a smart fluid-type ball joint. A controllable smart fluid (e.g., magneto-rheological fluid or electro-rheological fluid) is provided as the interface between socket base 50 and ball stem 52. Controller 56 facilitates application of a variable field charge (e.g., an electric field and/or magnetic field) to the smart fluid to operate lower control arm ball joint 48 between the first friction mode and the second, increased friction mode. In one example, by increasing the variable field charge, the friction force between socket base 50 and ball stem 52 can be increased such that lower control arm ball joint 48 changes operation from the first friction mode to the second, increased friction mode.

In another embodiment, lower control arm ball joint 48 includes a motor-type variable friction ball joint. Socket base 50 is equipped with a linear motor that actuates a friction seat associated with ball stem 52 to selectively vary the friction force between socket base 50 and ball stem 52. An example of a suitable motor-type variable friction ball joint is described in U.S. patent application Ser. No. 12/607,095, filed Oct. 28, 2009, which is hereby incorporated by reference in its entirety.

Referring again to FIG. 2, wheel knuckle 40 defines a bearing hub 58. A bearing (not shown) is supported within bearing hub 58 (e.g., in a press fit arrangement) to facilitate rotatable support of an axle shaft (not shown) with respect to wheel knuckle 40. A wheel hub (not shown) is coupled with the axle shaft (e.g., in a splined arrangement) and supports one of front wheels 28 with lugs (not shown).

Wheel knuckle 40 is coupled with suspension damper 42. As illustrated in FIG. 2, wheel knuckle 40 includes a suspension bracket 60 that is provided in a split clamp-type arrangement. A lower end 62 of suspension damper 42 is inserted into suspension bracket 60 and releasably coupled with bolts 64. Suspension damper 42 includes a spring flange 66 that provides underlying support for a spring 68. A strut bearing 70 overlies spring 68 and interfaces with an upper end 72 of suspension damper 42. Strut bearing 70 includes threaded stems 74 (FIG. 5) that facilitate coupling of upper end 72 of suspension damper 42 with a portion of frame 22 that resides above front wheels 28 (e.g., above a wheel well).

Figure 5:
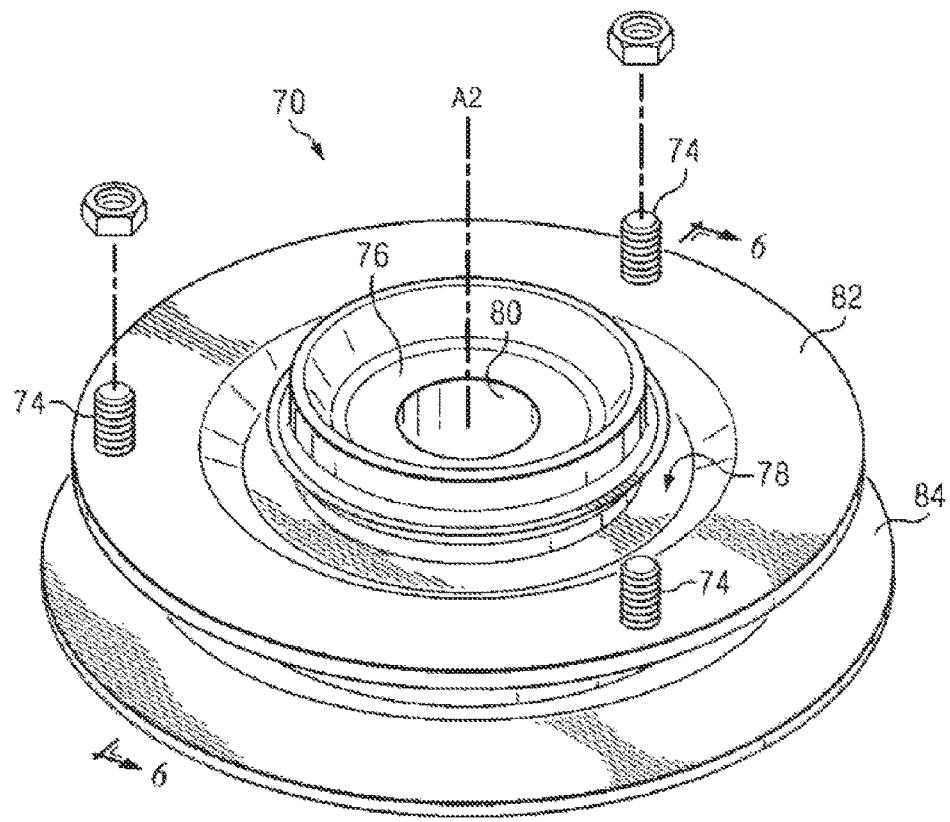
FIG. 5 is a perspective view of an exemplary strut bearing used with the suspension system of FIG. 2.

In the exemplary embodiment, as illustrated in FIG. 5, strut bearing 70 includes an inner race 76 and an outer race 78. Inner race 76 is formed from an elastomeric material (e.g., rubber), and defines a passageway 80 that receives upper end 72 of suspension damper 42. Outer race 78 defines a bolt flange 82 that supports threaded stems 74. Inner race 76 is journalled with respect to outer race 78 such that inner race 76 is rotatable with respect to outer race 78 about an axis A2. Strut bearing 70 also includes a spring plate 84 that contacts spring 68 when strut bearing 70 interferences upper end 72 of suspension damper 42, as shown in FIG. 2.

The ability of inner race 76 to rotate with respect to outer race 78 may be affected by a friction force (e.g., coefficient of friction) between inner race 76 and outer race 78. The greater the friction force between inner race 76 and outer race 78, the more difficult it can be to rotate inner race 76 with respect to outer race 78. In the exemplary embodiment, strut bearing 70 includes a friction control device that is configured such that the friction force between inner race 76 and outer race 78 can be selectively varied to change the freedom of movement between inner race 76 and outer race 78. Strut bearing 70 is operable between a first friction mode and a second, increased friction mode. As strut bearing 70 changes in operation from the first friction mode to the second, increased friction mode, the friction force between inner race 76 and outer race 78 increases, which can make movement of inner race 76 with respect to outer race 78 increasingly difficult. Strut bearing 70 is coupled with controller 56, as illustrated in FIG. 4, which facilitates variation in operation of strut bearing 70 between the first friction mode and the second, increased friction mode.

Figure 6:
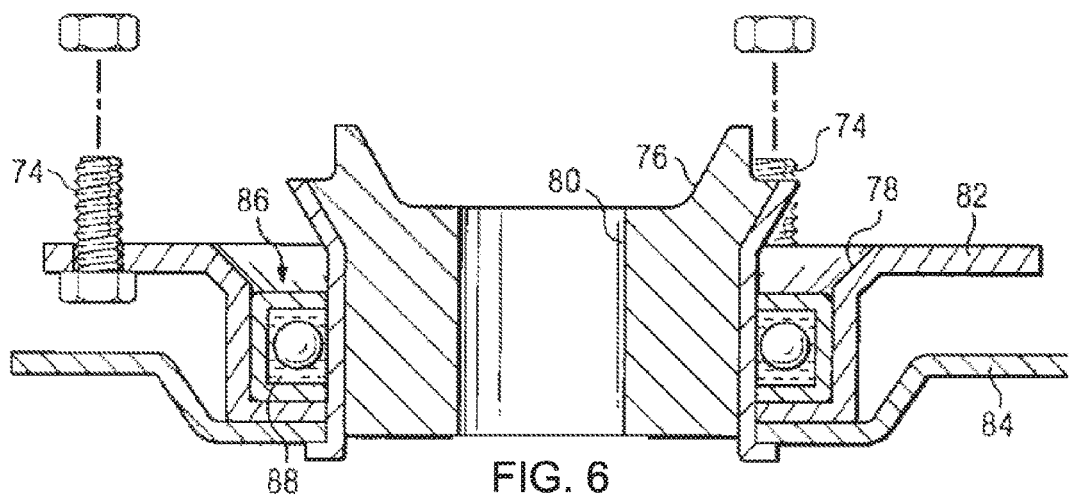
FIG. 6 is a cross-sectional view depicting the strut bearing of FIG. 5 and taken along line 6-6 in FIG. 5.

In the exemplary embodiment, strut bearing 70 includes a smart fluid-type strut bearing. As illustrated in FIG. 6, inner race 76 and outer race 78 are journalled with respect to each other by an annular bearing 86 that includes smart fluid 88 (e.g., magneto-rheological fluid or electro-rheological fluid). Controller 56 facilitates application of a variable field charge (e.g., an electric field and/or magnetic field) to smart fluid 88 such that operation of strut bearing 70 varies between the first friction mode and the second, increased friction mode. In one example, by increasing the variable field charge, the friction force between inner race 76 and outer race 78 increases to change operation of strut bearing 70 from the first friction mode to the second, increased friction mode.

Lower control arm ball joint 48 and strut bearing 70 cooperate to facilitate pivoting of wheel knuckle 40 about the king pin axis A3, as shown in FIG. 2. During operation of vehicle 20, support arm 38 pivots with respect to frame 22 to accommodate vertical movement of front wheel 28. Suspension damper 42 dampens the shock impulses imparted to support arm 38 that might otherwise affect the overall comfort of vehicle 20. It will be appreciated that a support arm and/or wheel knuckle may be provided in any of a variety of suitable alternative arrangements that facilitate rotatable support of a wheel with respect to a frame. For example, a vehicle can include an upper support arm and a lower support arm that can each be pivotably coupled with a frame of a vehicle (e.g., with bolts). Each of the upper and lower support arms may be coupled to the wheel knuckle with ball joints.

In some embodiments, suspension damper 42 includes a friction control device that is configured such that a friction force and/or friction torque of suspension damper 42 can be selectively varied to change the freedom of movement (e.g., rotation and compression) of lower and upper ends 62, 72 with respect to each other. In such an embodiment, suspension damper 42 is operable between a first friction mode and a second, increased friction mode. As suspension damper 42 operates from the first friction mode to the second, increased friction mode, the friction force and/or friction torque increases which can make movement of lower and upper ends 62, 72 with respect to each other increasingly difficult. It will be appreciated that suspension damper 42 may include any of a variety of suitable alternative cushion arrangements, such as an electromagnetic shock absorber, electrorheological shock absorber, or a fluid-type (e.g., pneumatic or hydraulic) shock absorber, for example. As illustrated in FIG. 4, suspension damper 42 is coupled with controller 56 which facilitates variation in operation of suspension damper 42 between the first friction mode and the second, increased friction mode.

Referring again to FIG. 2, vehicle 20 includes a steering assembly 90 that facilitates steering of vehicle 20. In the exemplary embodiment, as illustrated in FIG. 2, steering assembly 90 includes a rack and pinion steering arrangement including a pinion shaft 92, a rack 94, and a steering rack guide 96. Pinion shaft 92 and rack 94 are coupled together with intermeshing gear surfaces (not shown) located at steering rack guide 96. A tie rod 98 extends from rack 94 and is coupled with wheel knuckle 40 via an outer tie rod ball joint 100.

A steering shaft 102 operably couples a steering wheel (104 in FIG. 1) and pinion shaft 92 together. Operation of steering wheel 104 (e.g., to steer vehicle 20) moves tie rod 98 to pivot wheel knuckle 40 leftwardly and rightwardly about the king pin axis A3. Outer tie rod ball joint 100 facilitates pivoting of wheel knuckle 40 with respect to tie rod 98 during steering of vehicle 20. Outer tie rod ball joint 100 is similar in many respects to lower control arm ball joint 48. For example, in one embodiment, a socket base (e.g., 50) of outer tie rod ball joint 100 is coupled with tie rod 98, and a ball stem (e.g., 52) of outer tie rod ball joint 100 is coupled with wheel knuckle 40. In the exemplary embodiment, outer tie rod ball joint 100 includes a friction control device that is similar in many respects to lower control arm ball joint 48 as a friction control device as described above. As illustrated in FIG. 4, outer tie rod ball joint 100 is coupled with controller 56 to facilitate variation in operation of outer tie rod ball joint 100 between the first friction mode and the second, increased friction mode.

The ability of pinion shaft 92 to rotate and operate rack 94 may be affected by a friction force (e.g., a coefficient of friction) between pinion shaft 92 and steering rack guide 96 and a friction force (e.g., a coefficient of friction) between rack 94 and steering rack guide 96. The greater the friction forces between pinion shaft 92 and steering rack guide 96, and between rack 94 and steering rack guide 96, the more difficult it can be to rotate pinion shaft 92 with respect to steering rack guide 96 (e.g., to steer vehicle 20). In the exemplary embodiment, steering rack guide 96 includes a friction control device that is configured such that the friction forces between pinion shaft 92 and steering rack guide 96 and between rack 94 and steering rack guide 96 can be varied to change the freedom of movement between pinion shaft 92 and steering rack guide 96. Steering rack guide 96 may be selectively varied in operation between a first friction mode and second, increased friction mode. As steering rack guide 96 changes operation from the first friction mode to the, second increased friction mode, the friction forces between pinion shaft 92 and steering rack guide 96, and between rack 94 and steering rack guide 96 increase, thus making movement of pinion shaft 92 with respect to steering rack guide 96 increasingly difficult. In some embodiments, steering rack guide 96 includes a linear motor (not shown) that facilitates a change in the friction forces between pinion shaft 92 and steering rack guide 96, and between rack 94 and steering rack guide 96, such as is disclosed in U.S. patent application Ser. No. 12/814,593, filed Jun. 14, 2010, which is hereby incorporated by reference in its entirety. In an alternative embodiment, steering rack guide 96 includes smart fluid that reacts to a variable field charge to change the friction forces between pinion shaft 92 and steering rack guide 96 and between rack 94 and steering rack guide 96. As illustrated in FIG. 4, steering rack guide 96 is coupled with controller 56 to facilitate variation in operation of steering rack guide 96 between the first friction mode and the second, increased friction mode.

Although suspension system 36 is illustrated with respect to a left front wheel (e.g., 28), a suspension system can be provided in a similar arrangement for any of the wheels (e.g., 28, 30) of vehicle 20. In some embodiments, a wheel knuckle can include a non-steerable-type knuckle such as when the wheel knuckle is associated with one of rear wheels 30.

Figure 7:
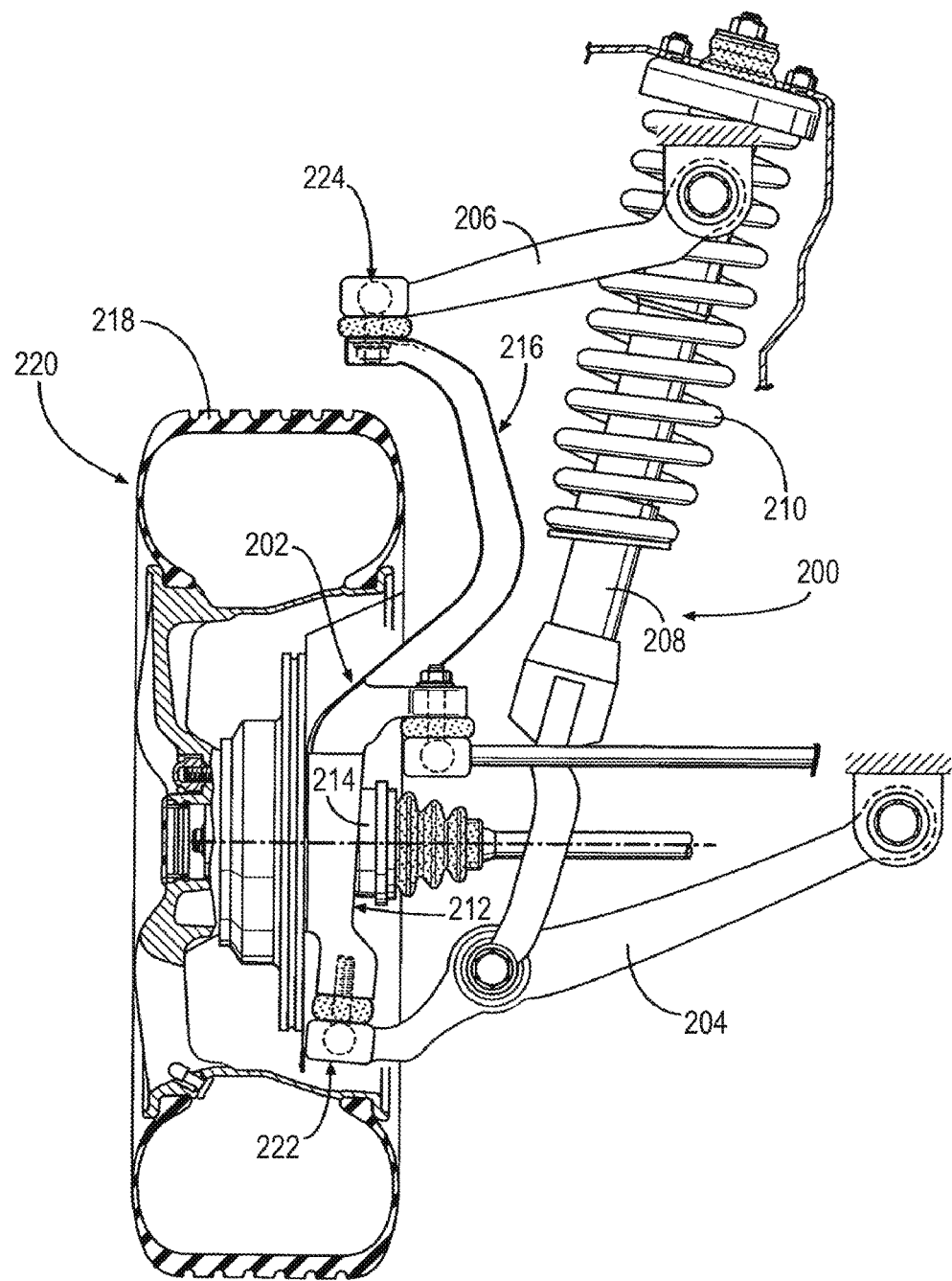
FIG. 7 is a rear view of a portion of another exemplary suspension system that may be used with the vehicle of FIG. 1.

Further, in other embodiments, vehicle 20 may include a suspension system having a configuration different than suspension system 36 shown in FIG. 2. For example, FIG. 7 is a rear view of another exemplary embodiment of a suspension system 200 that may be used with vehicle 20. Suspension system 200 illustrated in FIG. 7 is a double wishbone suspension that includes a knuckle 202, a lower control arm 204, an upper control arm 206, a hydraulic damper 208, and a suspension spring 210. Knuckle 202 includes a knuckle main body portion 212 for rotatably supporting an axle 214 via a ball bearing (not shown in FIG. 7), and an arm portion 216 extending upward from knuckle main body portion 212 over a tire 218 of front wheel 220. A lower control arm ball joint 222 is received within a ball bearing support hole defined in knuckle main body portion 212. Lower control arm ball joint 222 pivotably supports the extremity of lower control arm 204. An upper control arm ball joint 224 is mounted on an upper end of arm portion 216. Upper control arm ball joint 224 pivotably supports the extremity of upper control arm 206. Additional details of suspension system 200 are described in more detail in U.S. Pat. No. 7,234,712, issued Jun. 26, 2007, which is hereby incorporated herein by reference in its entirety.

In some embodiments, lower control arm ball joint 222 and upper control arm ball joint 224 may have the same configuration as lower control arm ball joint 48 described above with reference to FIGS. 1-4. In some embodiments, for example, each of lower control arm ball joint 222 and upper control arm ball joint 224 include a friction control device that is configured such that a friction force (e.g., coefficient of friction) between components of lower control arm ball joint 222 and upper control arm ball joint 224 may be selectively varied to change the freedom of movement between the components. In such embodiments, lower control arm ball joint 222 and upper control arm ball joint 224 can vary in operation between various friction modes associated with differing levels of resistance. Lower control arm ball joint 222 and upper control arm ball joint 224 may be coupled with controller 56 to facilitate variation in operation of lower control arm ball joint 222 and upper control arm ball joint 224 between the various friction modes.

As illustrated in FIG. 4, controller 56 is coupled with a speed sensor 112 and an acceleration sensor 114 to facilitate detection of the speed and acceleration of vehicle 20, respectively. In some embodiments, speed sensor 112 may include a speedometer sensor, wheel speed sensor(s) located on one or more of the wheels (e.g., as part of an antilock brake system), and/or any of a variety of other suitable speed sensor arrangements such as, for example, sensors associated with a transmission, a transfer assembly, or an engine, which can indirectly obtain speed data. In one embodiment, acceleration sensor 114 includes an accelerometer that detects longitudinal, vertical, and horizontal acceleration/deceleration of vehicle 20. In other embodiments, an acceleration sensor can include any of a variety of arrangements that facilitate detection of vehicular longitudinal, vertical, and/or horizontal acceleration/deceleration. In still other embodiments, speed sensor 112 and acceleration sensor 114 can be provided as outputs from a global positioning system (GPS). Controller 56 is coupled with transmission 32 and accelerator pedal 34 to detect an operating gear of transmission 32 and to detect a torque command signal from accelerator pedal 34. Controller 56 is coupled with a brake pedal 35, as illustrated in FIG. 4. In one embodiment, controller 56 detects operation of brake pedal 35 according to a brake switch. In such an embodiment, the brake switch can be associated with brake pedal 35 and selectively actuated by the brake pedal to operate brake lights on vehicle 20.

Vehicle 20 can be susceptible to vertical motion, such as when vehicle 20 travels over a crest of a hill, for example. The vertical motion can affect the overall performance of vehicle 20 such as by reducing contact of wheels 28, 30 with a roadway, for example. In one embodiment, controller 56 facilitates a change in operation of suspension damper 42, lower control arm ball joint 48, strut bearing 70, steering rack guide 96, outer tie rod ball joint 100, lower control arm ball joint 222, and/or upper control arm ball joint 224 (collectively referred to hereinafter as friction control devices) from a first friction mode to a second, increased friction mode to reduce vertical motion during operation. Operation of the friction control devices in an increased friction mode can facilitate effective reduction of vertical motion.

The magnitude of the vertical motion can vary, and some lower magnitudes of vertical motion may not be substantial enough to warrant attenuation. Controller 56 may accordingly operate the friction control devices between a plurality of friction modes associated with differing levels of resistance based on the magnitude of the vertical motion experienced by vehicle 20. Speed and vertical acceleration of vehicle 20 can affect whether the magnitude of vertical motion is substantial enough to warrant reduction. For example, when vehicle 20 is traveling above 15 kilometers per hour (K.P.H.) and undergoes a 2 $m/s^2$ vertical acceleration during operation, the vertical motion of vehicle 20 can be substantial enough to warrant attenuation.

In some embodiments, controller 56 facilitates a change in operation of the friction control devices from a first friction mode to a second, increased friction mode when the speed of vehicle 20 is above a threshold vehicular speed value and the vertical acceleration exceeds a threshold vertical acceleration value. In some embodiments, the threshold vehicular speed value refers to a threshold value of the speed of vehicle 20 when vehicle 20 undergoes vertical motion. In such an embodiment, controller 56 initiates operation of the friction control devices in first friction mode. If the speed of vehicle 20 remains below the threshold vehicular speed value and/or the vertical acceleration remains below the threshold vertical acceleration value, the friction control devices continue operating in the first friction mode. However, once the speed of vehicle 20 exceeds the threshold vehicular speed value and the vertical acceleration exceeds the threshold vertical acceleration value, controller 56 facilitates operation of the friction control devices in the second, increased friction mode to reduce vertical motion of vehicle 20. In another embodiment, to reduce vertical motion, controller 56 facilitates operation of the friction control devices in the second, increased friction mode when the vertical acceleration of vehicle 20 is above the threshold vertical acceleration value, irrespective of the speed of vehicle 20.

After a threshold time period has elapsed (e.g., 2 seconds), controller 56 returns operation of the friction control devices to the first friction mode. In another embodiment, controller 56 returns operation of the friction control devices to the first friction mode once the speed of vehicle 20 decreases below the threshold vehicular speed value and/or the vertical acceleration decreases below the threshold vertical acceleration value.

The speed of vehicle 20 can also affect a variety of vehicular operating conditions. For example, as the speed of vehicle 20 increases, operation of steering wheel 104 can become less difficult and can have a greater effect on the path of vehicle 20 (e.g., steering feel). Vehicle 20 can also be more susceptible to body roll (e.g., during turning) and drifting (e.g., due to due to canted road profile, wind, or asymmetry of the chassis). In some embodiments, controller 56 facilitates operation of the friction control devices according to the speed of vehicle 20 to improve the response of vehicle 20 to steering, body roll, and/or drifting.

In one embodiment, controller 56 facilitates a change in operation of the friction control devices from a first friction mode to a second, increased friction mode once the speed of vehicle 20 exceeds a threshold speed (e.g., about 40 K.P.H.). In another embodiment, controller 56 facilitates a change in operation of the friction control devices between a plurality of friction modes associated with differing levels of resistance according to the speed of vehicle 20. For example, when the speed of vehicle 20 is below about 10 K.P.H. or is between about 10-30 K.P.H. (e.g., operation at low speed), the friction control devices operate in a first friction mode and a second friction mode, respectively. When the speed of vehicle 20 is between about 30-50 K.P.H., between about 50-70 K.P.H., or is above about 70 K.P.H., the friction control devices operate in a third, fourth, and fifth friction mode, respectively. Changing operation among the first, second, third, fourth, and fifth friction modes, respectively, increases the friction force and/or friction torque of one or more of the friction control devices in order to affect the response of vehicle 20 to steering, body roll, and/or drifting in a desirable manner.

Controller 56 may additionally or alternatively facilitate a change in operation of the friction control devices between a first, nominal friction mode and a plurality of differing increased friction modes to accommodate vertical motion reduction. Moreover, controller 56 may additionally or alternatively facilitate a change in operation of the friction control devices between a first, nominal friction mode and a plurality of differing increased friction modes to accommodate brake judder attenuation and torque steer reduction, as described in more detail in U.S. Pat. No. 8,682,532, issued Mar. 25, 2014, which is hereby incorporated by reference in its entirety. While a plurality of the friction control devices can be simultaneously adjusted between a first, nominal friction mode and a plurality of increased friction modes, as described above, alternatively, different friction control devices of a common system can be operated at different times and/or in different ways to achieve a desired performance characteristic.

Repeated switching of the friction control devices between the different friction modes may result in less than optimal vehicle performance or may impair the driving experience for a user of the vehicle. Accordingly, in some embodiments, controller 56 is configured to inhibit or prevent the friction control devices from repeatedly switching between different friction modes.

Figure 8:
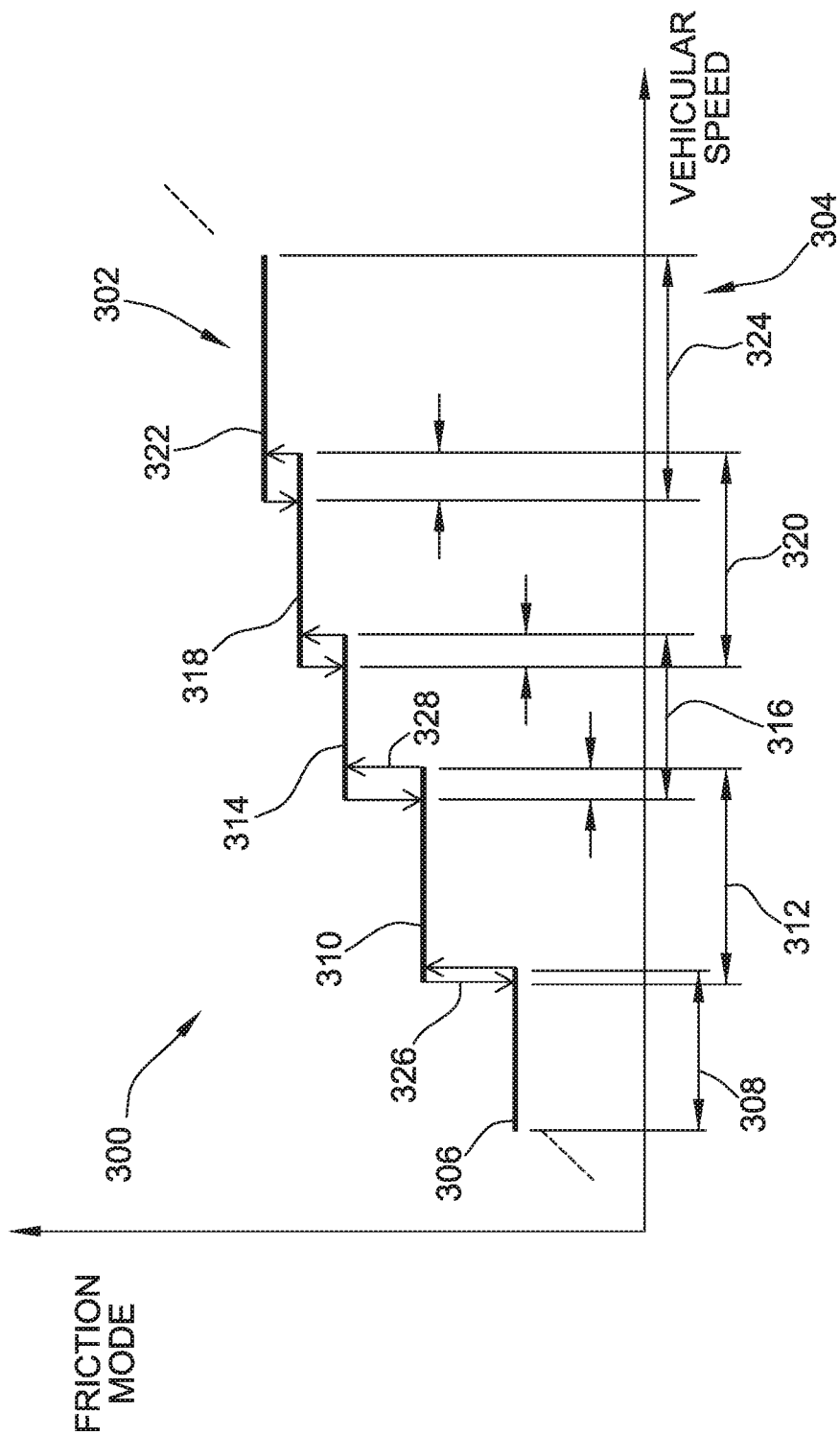
FIG. 8 is a chart depicting a graphical representation of an exemplary friction mode schedule that may be implemented by the controller of FIG. 4 to control one or more friction control devices.

In some embodiments, for example, controller 56 controls operation of one or more of the friction control devices according to a friction mode schedule. FIG. 8 is a graphical representation of an exemplary friction mode schedule 300. In the exemplary embodiment, friction mode schedule 300 defines a plurality of friction modes 302 and a plurality of overlapping speed regions 304, where each of speed regions 304 is associated with a corresponding friction mode of the plurality of friction modes 302. In the exemplary embodiment, friction mode schedule 300 includes five friction modes 302 and five speed regions 304. More specifically, friction mode schedule 300 includes a first friction mode 306 associated with a first speed region 308, a second friction mode 310 associated with a second speed region 312, a third friction mode 314 associated with a third speed region 316, a fourth friction mode 318 associated with a fourth speed region 320, and a fifth friction mode 322 associated with a fifth speed region 324. In other embodiments, friction mode schedule 300 may include more than or less than five friction modes 302 and five speed regions 304.

Controller 56 operates one or more of the friction control devices according to friction mode schedule 300 by changing operation of one or more of the friction control devices between friction modes 302 based on a detected vehicular speed of vehicle 20. Specifically, controller 56 may detect the vehicular speed of vehicle 20, and change operation of one or more of the friction control devices from a current friction mode (e.g., first friction mode 306) to the friction mode that corresponds with the speed region in which the vehicular speed falls (e.g. second friction mode 310). In one embodiment, for example, controller 56 changes operation of at least one of the friction control devices from first friction mode 306 to second friction mode 310 in response to the vehicular speed exceeding a first threshold speed value between first friction mode 306 and second friction mode 310, and changes operation of the at least one friction control device from second friction mode 310 to first friction mode 306 in response to the vehicular speed falling or decreasing below a second threshold speed value between first friction mode 306 and second friction mode 310.

In the exemplary graphical representation of friction mode schedule 300, the position of each of friction modes 302 along the y-axis indicates the level of resistance associated with the respective friction mode. Thus, higher friction modes are associated with a higher or increased level of resistance. For example, second friction mode 310 is associated with a higher level of resistance than first friction mode 306, third friction mode 314 is associated with a higher level of resistance than second friction mode 310, fourth friction mode 318 is associated with a higher level of resistance than third friction mode 314, and so on. In some embodiments, controller 56 changes operation of one or more of the friction control devices between friction modes 302 by changing at least one of a friction force and a friction torque of the friction control devices.

In some embodiments, friction mode schedule 300 may define a plurality threshold speed values at which controller 56 changes operation of one or more of the friction control devices from one friction mode to another friction mode. In the exemplary embodiment, each of speed regions 304 is bounded at its lower end by a lower threshold speed value 326 and is bounded at its upper end by an upper threshold speed value 328. Upper threshold speed values 328 represent the vehicular speed at which one or more of the friction control devices changes from a current friction mode to the next highest friction mode, and lower threshold speed values 326 represent the vehicular speeds at which one or more of the friction control devices change from a current friction mode to the next lowest friction mode.

In the exemplary embodiment, each of speed regions 304 overlaps at least one adjacent speed region. Consequently, upper threshold speed value 328 and lower threshold speed value 326 defining the threshold switching speeds between adjacent friction modes are different. For example, upper threshold speed value 328 associated with first speed region 308 is greater than lower threshold speed value 326 of second speed region 312, upper threshold speed value 328 associated with second speed region 312 is greater than lower threshold speed value 326 associated with third speed region 316, and so on. Thus, in the exemplary embodiment, the speed threshold at which the operation of a friction control device is changed from first friction mode 306 to the higher, second friction mode 310 is different than the speed threshold at which the friction control device is changed from second friction mode 310 back down to first friction mode 306. The same is true for changing operation of a friction control device between each of friction modes 302. As a result, repeated switching between friction modes is avoided when vehicle 20 is operated at or around one of the speed thresholds.

In some embodiments, such as the exemplary embodiment, the difference between the lower speed threshold value 326 associated with one speed region and the upper speed threshold value 328 associated with the preceding speed region (i.e., the amount of overlap between overlapping speed regions) may vary. For example, at higher speed ranges, the amount of overlap may be relatively large as compared to the amount of overlap between overlapping speed regions at lower speed regions to account for greater changes in vehicular speed when vehicle 20 is operated at higher speeds. In other embodiments, the amount of overlap between each speed region may be the same.

In some embodiments, friction mode schedule 300 is stored on a memory device, such as memory device 110 (FIG. 4), communicatively coupled to controller 56. Controller 56 may retrieve friction mode schedule 300 from memory device 110, and execute computer-executable instructions stored, for example, on memory device 110, to control operation of the friction control devices according to friction mode schedule 300. In some embodiments, more than one friction mode schedule may be stored on memory device 110 such that controller 56 can selectivity control operation of the friction control device according to different friction mode schedules.

In addition to or alternatively to operating one or more of the friction control devices according to a friction mode schedule, controller 56 may also facilitate inhibiting or preventing the friction control devices from repeatedly switching between different friction modes by implementing a time delay between successive changes in friction modes. In some embodiments, for example, controller 56 controls operation of one or more of the friction control devices such that successive changes between friction modes are permitted or enabled only after a time delay—i.e., after a predetermined amount of time has elapsed. For example, controller 56 may be programmed to prevent a change in friction mode within 3 seconds from an immediately preceding change in friction mode. The time delay may be any suitable time that enables operation of the friction control devices and controller 56 as described herein. The time delay may include, for example and without limitation, 1 second, 2 seconds, 3 seconds, 4 seconds, 5 seconds, or any other suitable time delay.

Further, in some embodiments, controller 56 may be configured to facilitate inhibiting or preventing the friction control devices from repeatedly switching between different friction modes by decreasing the resolution of a speed signal associated with the vehicular speed of vehicle 20. In the exemplary embodiment, controller 56 receives a speed signal from speed sensor 112 (FIG. 4). The resolution of the speed signal defines the minimum difference or change in vehicular speed that controller 56 is able to resolve. In one embodiment, for example, the resolution of the speed signal is 0.2 K.P.H., and controller 56 is able to resolve changes in vehicular speed of 0.2 K.P.H. The resolution of the speed signal thus determines how often or how frequently a vehicular speed value detected by controller 56 changes.

Decreasing the resolution of the speed signal, for example, from 0.2 K.P.H. to 3 K.P.H., will increase the incremental change in vehicular speed that controller 56 is able to detect or "see". That is, the resolution of the speed signal is inversely related to the incremental change in vehicular speed that controller 56 can detect. Thus, decreasing the resolution of the speed signal requires a greater change in vehicular speed in order for controller 56 to detect changes in vehicular speed. Accordingly, controller 56 can facilitate inhibiting or preventing the friction control devices from repeatedly switching between different friction modes by decreasing a speed signal resolution of the speed sensor. In some embodiments, controller 56 only decreases the speed signal resolution when the vehicular speed is within a predetermined speed range (e.g., within 5 K.P.H.) of one of threshold speed values 326, 328.

In some embodiments, controller 56 is configured to control operation of one or more of the friction control devices according to multiple friction mode schedules. In some embodiments, for example, controller 56 controls operation of one or more of the friction control devices according to a first friction mode schedule and a second, enhanced friction mode schedule.

Figure 9:
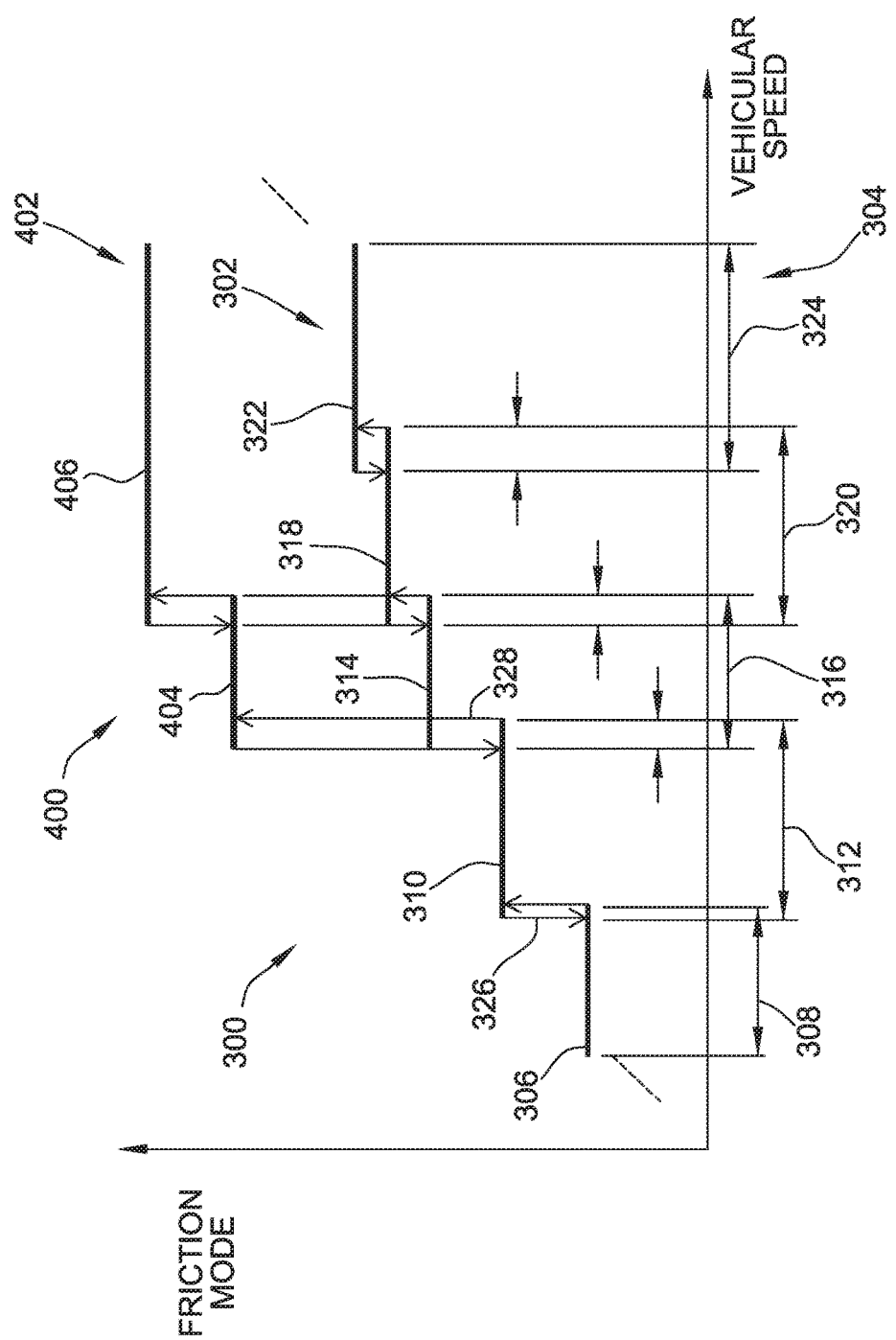
FIG. 9 is a chart depicting a graphical representation of another exemplary friction mode schedule that may be implemented by the controller of FIG. 4 to control one or more friction control devices of a vehicle.

FIG. 9, for example, graphically illustrates friction mode schedule 300 illustrated in FIG. 8 and a second, enhanced friction mode schedule 400. Enhanced friction mode schedule 400 defines a plurality of enhanced friction modes 402, where each of enhanced friction modes 402 is associated with a corresponding speed region. In the exemplary embodiment, each of enhanced friction modes 402 is associated with one or more of speed regions 304 defined by friction mode schedule 300. Specifically, in the exemplary embodiment, enhanced friction mode schedule 400 includes a first enhanced friction mode 404 associated with third speed region 316 of friction mode schedule 300, and a second enhanced friction mode 406 associated with fourth speed region 320 and fifth speed region 324 defined by friction mode schedule 300. In other embodiments, one or more of enhanced friction modes 402 may be associated with speed regions other than those defined by friction mode schedule 300.

Enhanced friction modes 402 are generally associated with a higher level of resistance than each of friction modes 302 of friction mode schedule 300. Use of the second, enhanced friction mode schedule 400 in addition to friction mode schedule 300 enables the friction control devices to be changed to a higher level of resistance when one or more operating parameters of vehicle 20 warrant a change to the higher level of resistance.

In the exemplary embodiment, enhanced friction mode schedule 400 is a vertical acceleration based friction mode schedule that enables operation of one or more of the friction control devices to be changed into one of enhanced friction modes 402 based at least in part on a vertical acceleration rate of vehicle 20. Specifically, controller 56 controls operation of one or more of the friction control devices according to enhanced friction mode schedule 400 by switching between friction modes 302 defined by friction mode schedule 300 and enhanced friction modes 402 defined by second friction mode schedule 400 based at least in part on a vertical acceleration rate of vehicle 20. Specifically, controller 56 changes operation of one or more of the friction control devices from one of friction modes 302 of friction mode schedule 300 to one of enhanced friction modes 402 in response to the vertical acceleration rate of vehicle 20 exceeding a threshold vertical acceleration rate.

In some embodiments, controller 56 changes operation of one or more of the friction control devices from one of friction modes 302 of friction mode schedule 300 to one of enhanced friction modes 402 when the vertical acceleration rate of vehicle 20 exceeds a threshold vertical acceleration rate. For example, controller 56 may change operation of one or more of the friction control devices from third friction mode 314 to first enhanced friction mode 404 in response to the vertical acceleration rate of vehicle 20 exceeding a threshold acceleration rate while the vehicular speed is within a speed region associated with one or both of third friction mode 314 and first enhanced friction mode 404 (e.g., third speed region 316).

In other embodiments, controller 56 changes operation of one or more of the friction control devices from one of friction modes 302 of friction mode schedule 300 to one of enhanced friction modes 402 in response to both the vehicular speed exceeding a threshold speed value and the vertical acceleration rate of vehicle 20 exceeding a threshold vertical acceleration value. For example, controller 56 may change operation of one or more of the friction control devices from second friction mode 310 to first enhanced friction mode 404 in response to both the vehicular speed of vehicle 20 exceeding upper speed threshold value 328 associated with second speed region 312 and the vertical acceleration rate of vehicle 20 exceeding a threshold acceleration rate associated with first enhanced friction mode 404.

The systems and methods described herein facilitate preventing or inhibiting repeated switching of friction control devices between different friction modes. For example, the systems and methods described herein control operation of friction control devices according to a friction mode schedule, which defines a plurality of overlapping speed regions, each associated with a corresponding friction mode. Because the speed regions overlap with one another, the vehicular speed at which a friction control device changes from a first friction mode to a second friction mode is different than the vehicular speed at which the friction control device changes back to the first friction mode from the second friction mode. As a result, the friction control device will not repeatedly switch between two friction modes, even when the vehicle is operated at a vehicular speed near a threshold speed between two friction modes.

Additionally, in some embodiments, the systems and methods described herein use a time delay between successive friction mode changes to prevent repeated switching between friction modes. Further, in some embodiments, the systems and methods described herein decrease the resolution of a speed signal associated with a vehicular speed of the vehicle to prevent or inhibit repeated switching between different friction modes. Decreasing the resolution of the speed signal requires a greater change in vehicular speed for the controller of the vehicle to detect changes in vehicular speed, and thereby facilitates inhibiting or preventing the controller from repeatedly switching the friction control devices between different friction modes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling a vehicle, the method comprising:
    operating at least one friction control device in a first of a plurality of friction modes, the first friction mode associated with a first speed range, the at least one friction control device including one of a suspension damper, a control arm ball joint, a strut bearing, a steering rack guide, and an outer tie rod ball joint;
    detecting a vehicular speed;
    changing operation of the at least one friction control device from the first friction mode to a second of the plurality of friction modes in response to the vehicular speed exceeding a first threshold speed value, wherein the second friction mode is associated with a higher level of resistance than the first friction mode and a second speed range that overlaps the first speed range by a first amount;
    changing operation of the at least one friction control device from the second friction mode to the first friction mode in response to the vehicular speed falling below a second threshold speed value that is less than the first threshold speed value; and
    changing operation of the at least one friction control device from the second friction mode to a third of the plurality of friction modes in response to the vehicular speed exceeding a third threshold value greater than the first threshold value, wherein the third friction mode is associated with a higher level of resistance than the second friction mode and a third speed range that overlaps the second speed range by a second amount greater than the first amount.

2. The method of claim 1, wherein the first, second, and third speed ranges and the first and second amounts are defined by a friction mode schedule, and wherein changing operation of the at least one friction control device comprises changing operation of the at least one friction control device according to the friction mode schedule.

3. The method of claim 1, wherein changing operation of the at least one friction control device from the first friction mode to the second friction mode comprises increasing one of a friction force and a friction torque of the at least one friction control device.

4. The method of claim 1 further comprising controlling operation of the at least one friction control device such that successive changes between the first friction mode and the second friction mode are enabled only after a predetermined amount of time has elapsed.

5. The method of claim 1, wherein detecting the vehicular speed includes detecting the vehicular speed using a speed sensor, the method further comprises decreasing a speed signal resolution of the speed sensor when the vehicular speed is within a predetermined range of one of the first and the second threshold speed values.

6. The method of claim 1, further comprising:
detecting a vertical acceleration rate of the vehicle; and
changing operation of the at least one friction control device from the first friction mode to a first enhanced friction mode of a plurality of enhanced friction modes in response to the vertical acceleration rate exceeding a threshold acceleration rate while the vehicular speed is within the first speed range, wherein the first enhanced friction mode is associated with a higher level of resistance than the first friction mode.

7. The method of claim 6, wherein the first friction mode and the first enhanced friction mode are both associated with the first speed range.

8. The method of claim 1, further comprising:
detecting a vertical acceleration rate of the vehicle; and
changing operation of the at least one friction control device from the first friction mode to a second enhanced friction mode of a plurality of enhanced friction modes in response to both the vehicular speed exceeding the first threshold speed value and the vertical acceleration rate exceeding a threshold vertical acceleration value, wherein the second enhanced friction mode is associated with a higher level of resistance than the second friction mode.

9. The method of claim 8, wherein the second friction mode and the second enhanced friction mode are associated with the second speed range.

10. A vehicle control system for use in controlling operation of a vehicle, the system comprising:
at least one friction control device configured to operate in a first of a plurality of friction modes, the first friction mode associated with a first speed range, the at least one friction control device comprising one of a suspension damper, a control arm ball joint, a strut bearing, a steering rack guide, and an outer tie rod ball joint; and
a controller communicatively coupled to the at least one friction control device, the controller configured to:
detect a vehicular speed of the vehicle;
change operation of the at least one friction control device from the first friction mode to a second of the plurality of friction modes in response to the vehicular speed exceeding a first threshold speed value, the second friction mode associated with a higher level of resistance than the first friction mode and a second speed range that overlaps the first speed range by a first amount;
change operation of the at least one friction control device from the second friction mode to the first friction mode in response to the vehicular speed falling below a second threshold speed value that is less than the first threshold speed value; and
change operation of the at least one friction control device from the second friction mode to a third of the plurality of friction modes in response to the vehicular speed exceeding a third threshold value greater than the first threshold value, wherein the third friction mode is associated with a higher level of resistance than the second friction mode and a third speed range that overlaps the second speed range by a second amount greater than the first amount.

11. The system of claim 10, wherein the controller comprises a processor communicatively coupled to a memory device having a friction mode schedule stored thereon, the friction mode schedule defining the first, second, and third speed ranges and the first and second amounts, wherein the controller is configured to change operation of the at least one friction control device between the plurality of friction modes according to the friction mode schedule.

12. The system of claim 10, wherein the controller is configured to change operation of the at least one friction control device from the first friction mode to the second friction mode by increasing one of a friction force and a friction torque of the at least one friction control device.

13. The system of claim 10, wherein the controller is configured to control operation of the at least one friction control device such that successive changes between the first friction mode and the second friction mode are enabled only after a predetermined amount of time has elapsed.

14. The system of claim 10 further comprising a speed sensor communicatively coupled to the controller and configured to detect the vehicular speed of the vehicle, wherein the controller is configured to decrease a speed signal resolution of the speed sensor when the vehicular speed is within a predetermined speed range of one of the first threshold speed value and the second threshold speed value.

15. The system of claim 10, wherein the at least one friction control device comprises an upper control arm ball joint.

16. The system of claim 10, wherein the at least one friction control device comprises a plurality of friction control devices and at least two friction control devices of the plurality of friction control devices are differing ones of a suspension damper, a lower control arm ball joint, an upper control arm ball joint, a strut bearing, a steering rack guide, and an outer tie rod ball joint.

17. The system of claim 10, wherein the controller is further configured to:
detect a vertical acceleration rate of the vehicle; and
change operation of the at least one friction control device from the first friction mode to a first of a plurality of enhanced friction modes in response to the vertical acceleration rate exceeding a threshold acceleration rate while the vehicular speed is within the first speed range, wherein the first enhanced friction mode is associated with a higher level of resistance than the first friction mode.

18. The system of claim 10, wherein the controller is further configured to:
detect a vertical acceleration rate of the vehicle; and
change operation of the at least one friction control device from the first friction mode to a second of a plurality of enhanced friction modes in response to both the vehicular speed exceeding the first threshold speed value and the vertical acceleration rate exceeding a threshold vertical acceleration value, wherein the second enhanced friction mode is associated with a higher level of resistance than the second friction mode.

19. A controller for use in controlling operation of at least one friction control device operatively coupled to a vehicle and communicatively coupled to the controller, the controller comprising:
- a processor;
- a memory device communicatively coupled to the processor; and
- computer-executable instructions stored on the memory device that, when executed by the processor, cause the controller to:
  - detect a vehicular speed of the vehicle;
  - change operation of the at least one friction control device from a first of a plurality of friction modes to a second of the plurality of friction modes in response to the vehicular speed exceeding a first threshold speed value, wherein the first friction mode is associated with a first speed range, and wherein the second friction mode is associated with a higher level of resistance than the first friction mode and a second speed range that overlaps the first speed range by a first amount;
  - change operation of the at least one friction control device from the second friction mode to the first friction mode in response to the vehicular speed falling below a second threshold speed value that is less than the first threshold speed value; and
  - change operation of the at least one friction control device from the second friction mode to a third of the plurality of friction modes in response to the vehicular speed exceeding a third threshold value greater than the first threshold value, wherein the third friction mode is associated with a higher level of resistance than the second friction mode and a third speed range that overlaps the second speed range by a second amount greater than the first amount.

20. The controller of claim 19, wherein the memory device includes a friction mode schedule stored thereon, the friction mode schedule defining the first, second, and third speed ranges and the first and second amounts, wherein the computer-executable instructions, when executed by the processer, cause the controller to change operation of the at least one friction control device between the plurality of friction modes according to the friction mode schedule.

21. The method of claim 1 further comprising:
- changing operation of the at least one friction control device from the third friction mode to the second friction mode in response to the vehicular speed falling below a fourth threshold speed value that is less than the third threshold speed value and greater than the first threshold speed value.

* * * * *